United States Patent
Lindoff (10) Patent No.: US 7,680,082 B2
(45) Date of Patent: Mar. 16, 2010

(54) CELL SELECTION IN HIGH-SPEED DOWNLINK PACKET ACCESS COMMUNICATION SYSTEMS

(75) Inventor: Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1094 days.

(21) Appl. No.: 11/289,001

(22) Filed: Nov. 29, 2005

(65) Prior Publication Data

US 2007/0121552 A1    May 31, 2007

(51) Int. Cl.
*H04W 4/00* (2009.01)
*H04W 36/00* (2009.01)

(52) U.S. Cl. ..................... 370/333; 455/436
(58) Field of Classification Search ......... 370/331–334; 455/436, 437, 439, 442, 443
See application file for complete search history.

(56) References Cited

U.S. PATENT DOCUMENTS

| | | | |
|---|---|---|---|
| 6,532,258 B1 * | 3/2003 | Goldston et al. ............ 375/227 |
| 6,549,781 B1 | 4/2003 | O'Byrne et al. |
| 6,711,420 B1 | 3/2004 | Amerga et al. |
| 6,771,963 B1 | 8/2004 | Cheng et al. |
| 6,816,709 B2 | 11/2004 | Dickey |
| 2003/0012308 A1 | 1/2003 | Sampath et al. |
| 2003/0017837 A1 * | 1/2003 | Kalliojarvi ................. 455/522 |
| 2003/0031119 A1 | 2/2003 | Kim et al. |
| 2003/0096618 A1 | 5/2003 | Palenius |
| 2003/0224733 A1 * | 12/2003 | Schwarz et al. .......... 455/67.11 |
| 2003/0236074 A1 * | 12/2003 | Ishii et al. .................... 455/69 |
| 2004/0100926 A1 | 5/2004 | Sipila et al. |
| 2004/0105489 A1 | 6/2004 | Kim et al. |
| 2004/0242156 A1 | 12/2004 | Tiirola et al. |
| 2005/0032520 A1 | 2/2005 | Muller |
| 2005/0070267 A1 | 3/2005 | Vishwanath et al. |
| 2005/0105647 A1 | 5/2005 | Wilhelmsson et al. |

FOREIGN PATENT DOCUMENTS

| | | |
|---|---|---|
| EP | 1 370 010 A1 | 12/2003 |
| EP | 1 414 201 A1 | 4/2004 |
| EP | 1 480 350 A1 | 11/2004 |
| EP | 1 499 147 A1 | 1/2005 |
| EP | 1 511 185 A1 | 3/2005 |
| GB | 2 397 469 A | 7/2004 |
| WO | 02/082683 A2 | 10/2002 |

(Continued)

OTHER PUBLICATIONS

PCT Search Report, mailed Feb. 22, 2007, in connection with International Application No. PCT/EP2006/067687.

(Continued)

*Primary Examiner*—Patrick N Edouard
*Assistant Examiner*—Michael T Thier
(74) *Attorney, Agent, or Firm*—Potomac Patent Group PLLC (57) ABSTRACT

The usual determination of signal-to-noise ratio $E_C/I_0$ in a communication system is modified such that $E_C/I_0$ is also based on either or both of the path delay profile (PDP) and estimates of the load on a cell in the communication system. The PDP may be obtained from a path searcher in a receiver that is already needed for estimating the received signal code power of a channel such as a common pilot channel. Because PDP information is already available, it can easily be incorporated into the $E_C/I_0$ measurements.

31 Claims, 5 Drawing Sheets

FOREIGN PATENT DOCUMENTS

| | | |
|---|---|---|
| WO | 03/005753 A1 | 1/2003 |
| WO | 2004/064294 A2 | 7/2004 |
| WO | 2004/091103 A2 | 10/2004 |
| WO | 2005/089009 A1 | 9/2005 |

OTHER PUBLICATIONS

PCT Written Opinion, mailed Feb. 22, 2007, in connection with International Application No. PCT/EP2006/067687.

Proakis, J., "Digital Communications", Section 14.1.1, 4th Ed., McGraw-Hill, 2001.

3GPP TSG-RAN WG1 Ad Hoc on LTE, "Principles for the Evolved UTRA Radio-Access Concept", Sophia Antipolis, France, Jun. 20-21, 2005.

Ekstrom, H. et al., "Technical solutions for the 3G long-term evolution", IEEE Communications Magazine, vol. 44, Issue 3, pp. 38-45, Mar. 2006.

* cited by examiner

FIG. 2B $SNR_{206} > SNR_{204}$

CELL SELECTION IN HIGH-SPEED DOWNLINK PACKET ACCESS COMMUNICATION SYSTEMS

BACKGROUND

This invention relates to electronic digital communication systems, for example radiotelephone systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS and WCDMA standards. This application focusses on WCDMA systems for simplicity, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. Since all users share the same radio resource in CDMA systems, it is important that each physical channel does not use more power than necessary. This is achieved by a transmit power control (TPC) mechanism, in which, among other things, base stations send TPC commands to users in the downlink (DL) direction and the users implement the commands in the uplink (UL) direction. The TPC commands cause the users to increase or decrease their transmitted power levels by increments, thereby maintaining target signal-to-interference ratios (SIRs) for the dedicated physical channels (DPCHs) between the base stations and the users. WCDMA terminology is used here, but it will be appreciated that other systems have corresponding terminology. Scrambling and channelization codes and transmit power control are well known in the art.

Figure 1:
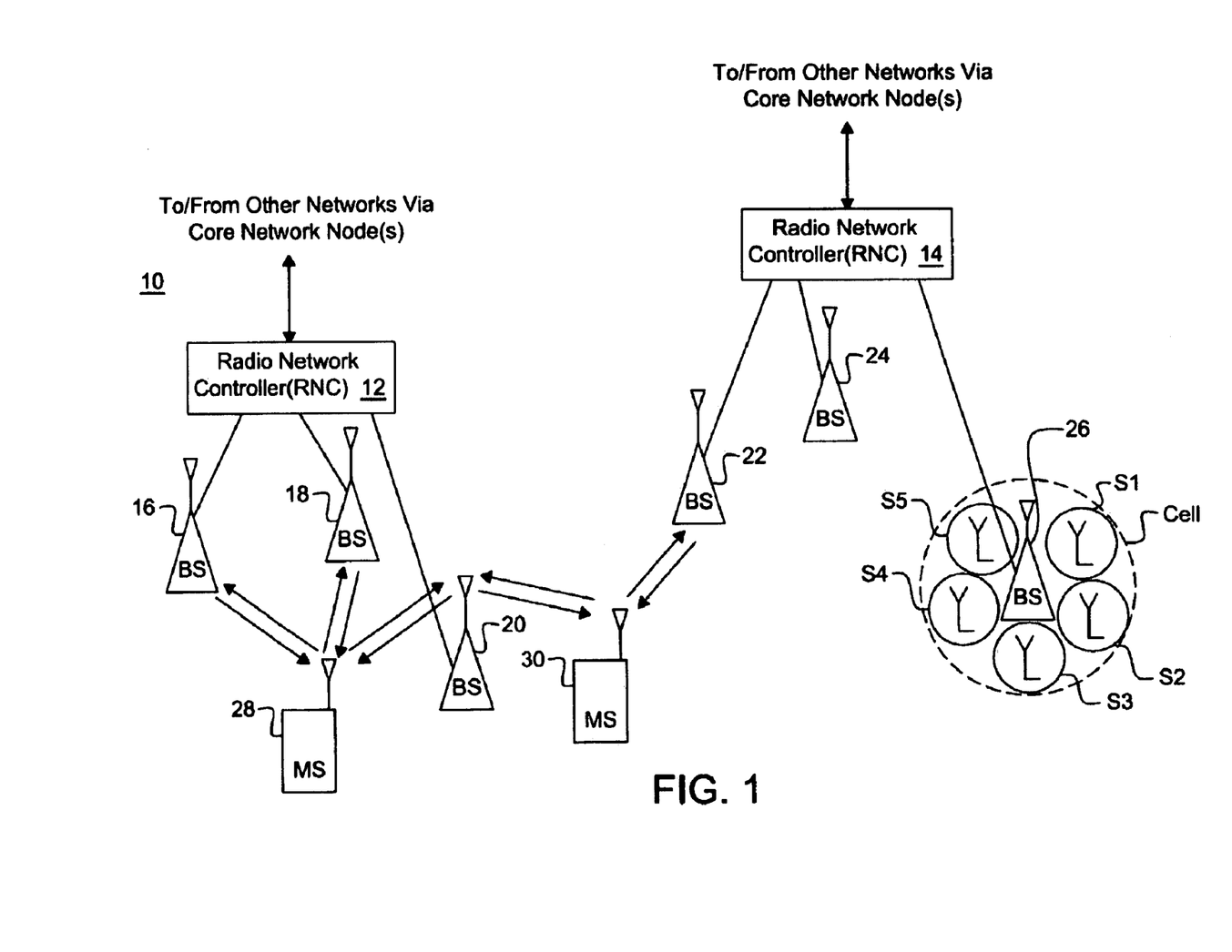
FIG. 1 depicts a mobile radio cellular telecommunication system.

FIG. 1 depicts a mobile cellular radio telecommunication system 10, which may be, for example, a WCDMA communication system. Radio network controllers (RNCs) 12, 14 control various radio network functions, including for example radio access bearer setup, diversity handover, etc. More generally, each RNC directs mobile station (MS), or user equipment (UE), calls via the appropriate base station(s) (BSs), which communicate with each UE through DL, or forward, and UL (i.e., mobile-to-base, or reverse) channels. RNC 12 is shown coupled to BSs 16, 18, 20, and RNC 14 is shown coupled to BSs 22, 24, 26. Each BS, which is called a Node B in 3GPP parlance, serves a geographical area that can be divided into one or more cell(s). BS 26 is shown as having five antenna sectors S1-S5, which can be said to make up the cell of the BS 26. The BSs are coupled to their corresponding RNCs by dedicated telephone lines, optical fiber links, microwave links, etc. Both RNCs 12, 14 are connected with external networks such as the public switched telephone network (PSTN), the Internet, etc. through one or more core network nodes, such as a mobile switching center (not shown) and/or a packet radio service node (not shown).

In such a communication system, each BS transmits predetermined pilot symbols on the UE's DPCH. The BS also transmits pilot symbols on a common pilot channel (CPICH), and a UE typically uses the CPICH pilot symbols in estimating the impulse response of the radio channel to the BS. It will be recognized that the UE uses the CPICH pilots for channel estimation, rather than the DPCH pilots, due to the CPICH's typically higher signal-to-noise ratio (SNR), but the UE still uses the DPCH pilots, mainly for SIR estimation, i.e., for DL power control.

High-speed downlink packet access (HSDPA) is an evolution of WCDMA communication systems that provides higher bit rates, e.g., up to more than 10 megabits per second (Mb/s), by using higher-order modulation, e.g., 16-ary quadrature amplitude modulation (16-QAM), multiple spreading codes, e.g., up to fifteen codes with spreading factors of 16, and DL-channel feedback information. HSDPA is described in, for example, the Release 5 version of the system specifications promulgated by the 3GPP. The DL-channel feedback information is information sent by a UE to a BS through the UL channel regarding the DL channel's quality. The BS uses that information to optimize DL modulation and coding for throughput.

HSDPA also introduces time division multiplex (TDM) in WCDMA by transmitting, in time chunks using excess channel transmit power that a BS may have, to one or a few UEs (typically the UE or UEs that have the best DL channel(s)). The excess channel transmit power $E_C^e$ is just the difference between the total available channel transmit power $E_C^{max}$ and the transmit power in current use for other channels $E_C^{other\ channels}$. The other channels include all common channels and DPCHs.

HSDPA also employs a hybrid automatic repeat request (ARQ) scheme on the physical layer in order to reduce the round-trip delay of erroneous received packets. The hybrid ARQ scheme involves transmission by the UE of acknowledgment (ACK) and non-acknowledgment (NACK) messages to the BS providing HSDPA service. This BS may be called the "serving" BS or cell. The HS-channels in the DL are transmitted only from the HSDPA serving cell, and HSDPA UL control signaling (including ACK/NACK and DL-channel quality reports) is detected by only the HSDPA serving cell.

As user terminals move with respect to the base stations, and possibly vice versa, on-going connections are maintained through a process of hand-off, or handover. For example in a cellular telephone system, as a user moves from one cell to another, the user's connection is handed over from one base station to another. Early cellular systems used hard handovers (HHOs), in which a first cell's base station (covering the cell that the user was leaving) would stop communicating with the user just as the second base station (covering the cell that the user was entering) started communication. Modern cellular systems typically use diversity, or soft, handovers (SHOs), in which a user is connected simultaneously to two or more base stations. In FIG. 1, MSs 28, 30 are shown communicating with plural base stations in diversity handover situations. MS 28 communicates with BSs 16, 18, 20, and MS 30 communicates with BSs 20, 22. A control communication link between the RNCs 12, 14 permits diversity communications to/from the MS 30 via the BSs 20, 22.

HSDPA can be used in mobility situations, e.g., where a UE and the BS(s) move with respect to one another, but soft handover is not specified for HSDPA channels. HSDPA channels support only hard handover. Therefore, there can be many situations in which a UE uses SHO for its DPCH(s) at the same time that it uses HHO for its HSDPA channel(s). The HS-channels in the DL are transmitted only from the HSDPA serving cell and HSDPA UL control signaling (including ACK/NACK and channel quality reports) is detected by only the HSDPA serving cell.

Figure 2A:
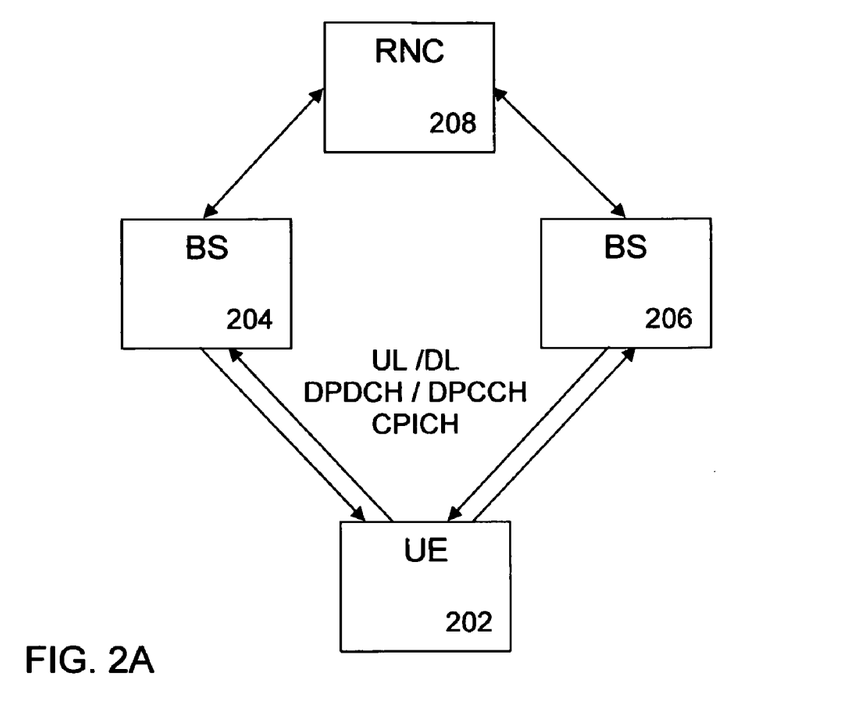
FIGS. 2A, 2B, 2C depict a UE in a SHO situation for non-HSDPA channel(s) and using services transported through HSDPA channels.

FIG. 2A depicts a typical one of the situations in which a UE 202 is in a SHO situation for non-HSDPA channel(s) and is using services transported through HSDPA channels. The UE 202 has simultaneous connections with BS 204 and BS 206 via dedicated physical data channels (DPDCHs) and dedicated physical control channels (DPCCHS) in both the UL and DL. In short, the UE 202 is in SHO with respect to these non-HSDPA channels. The BSs 204, 206 are controlled by an RNC 208. On the DPDCHs, higher-layer network signaling and maybe also speech or video services are transmitted. The DPCCH carries physical layer control signaling (e.g., pilot symbols/sequences, TPC commands, etc.). A CPICH is also provided in the DLs from the base stations.

Figure 2B:
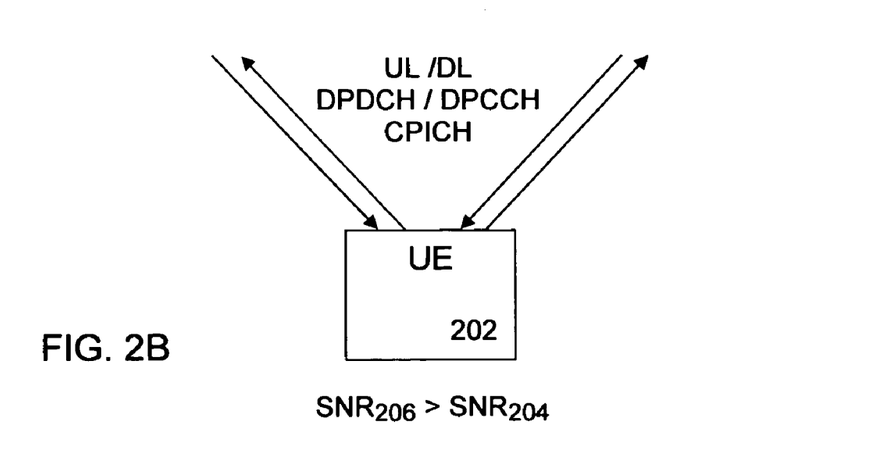

FIG. 2B is similar to FIG. 2A in that it depicts the UE 202 having multiple simultaneous connections with BS 204 and a BS 206 (not shown) via DPDCHs and DPCCHs in the UL and the DL. RNC 208 (not shown) controls BS 204 and BS 206. In support of setting up a packet data session through HSDPA, the UE 202 measures on a regular basis (typically five times per second) the average SNR $E_C/I_0$ on the CPICHs from all of the base stations, or cells, in its "Active Set", which are the base station(s) connected to the UE. This SNR is usually called the CPICH RSCP/RSSI and is given by:

$$E_C/I_0 = RSCP/RSSI \quad (1)$$

where RSCP is received signal code power (in this case, on the CPICH) and RSSI is received signal strength indicator. The best cell, i.e., the base station whose CPICH is received by the UE with the highest $E_C/I_0$, will be the HSDPA serving cell. In FIG. 2B, the SNR of BS 206 is indicated as greater than the SNR of BS 204.

Figure 2C:
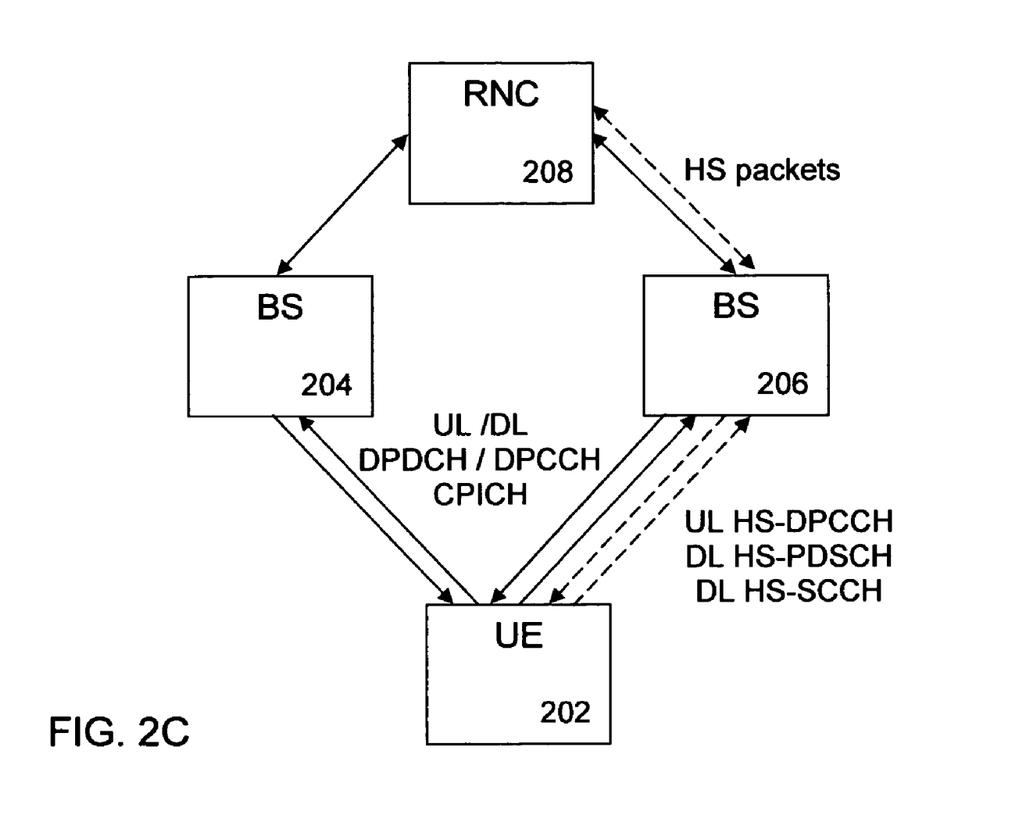

FIG. 2C is also similar to FIGS. 2A and 2B. In FIG. 2C, an HSDPA session has been set up between BS 206 and UE 202, and the figure indicates by dashed lines the HSDPA channels, i.e., a DL high-speed packet data shared channel (HS-PD-SCH) carrying HS data packets, a DL high-speed shared control channel (HS-SCCH) carrying DL control information for the HS data packets, and an UL high-speed dedicated physical control channel (HS-DPCCH) carrying ACK/NACK reports and DL channel quality information. The DL HSDPA channels are transmitted only by the HS serving cell (BS 206 in FIG. 2C), and the UL HSDPA channel is received only by the HS serving cell. HS data packets are also exchanged by the serving BS 206 and the RNC 208.

Problems can arise because, as currently defined by the HSDPA specifications, the HS serving cell is selected as the cell having the highest CPICH $E_C/I_0$ but that parameter does not always correspond to the actual SNR for HSDPA detection. Hence, the best HS serving cell according to CPICH $E_C/I_0$ is not necessarily the best HS serving cell with respect to HSDPA throughput. This can be understood from the following example.

Assume a two-cell scenario, such as that depicted in FIGS. 2A, 2B, 2C, in which the number of receiver taps, or fingers, devoted to radio channel paths from BS A and BS B are $L_A$, $L_B$, respectively. Also assume that the average total transmitted BS powers are $E_C^{Atot}$, $E_C^{Btot}$, respectively, and the maximum available BS power is $E_C^{max}$ and is the same for both BSs.

Then, the CPICH $E_C/I_0$ for BS A is given by the following expression:

$$\left(\frac{E_c}{I_o}\right)_A = \frac{\sum_{j=1}^{L_A} E_c^{A,j}}{\sum_{j=1}^{L_A} E_c^{j,Atot} + \sum_{j=1}^{L_B} E_c^{j,Btot} + \sigma^2} \quad (2)$$

where $E_C^{A,j}$ is the CPICH power for finger j, and $\sigma^2$ is the noise power. Hence, $E_C/I_0$ is the sum of CPICH power over all fingers, or paths, divided by the total received signal and noise power. It will be understood that channel estimates may be implicitly included in Eq. 2 and other equations described below.

At the same time, it is known in the art that the HSDPA performance (assuming a RAKE receiver) is proportional to the SIR of the HSDPA channel, e.g., from BS A, that is given by the following expression:

$$SIR_{HSDPA}^A \approx \sum_{l=1}^{L_A} \frac{E_c^{l,max} - E_c^{l,Atot}}{\sum_{j \neq l} E_c^{j,Atot} + \sum_{j=1}^{L_B} E_c^{j,Btot} + \sigma^2} \quad (3)$$

which can be seen as the excess BS power divided by the non-orthogonal noise.

Examples can easily be found where BS A will be the HS serving cell (best cell according to Eq. 2) at the same time that BS B (or some other cell) will have the highest potential HSDPA SIR (according to Eq. 3). One such example is to let $L_B=1$, $L_A=2$ (with equal path strength), and $E_C^{Btot}<E_C^{Atot}$, which is to say that BS B has lower average load than BS A, and to let CPICH $E_C^A = E_C^B + \Delta$, which is to say that a slightly stronger CPICH is received from BS A compared to BS B. In such a case, the UE will use BS A as the serving HS cell but a better throughput (and system utilization) could be achieved using BS B instead. It will be noted that the channel for BS B is only one tap, making the intra-cell interference orthogonal.

SUMMARY

Hence, there is a need for methods and apparatus that modify conventional $E_C/I_0$ measurements by taking path delay profile and BS load into account, for example when choosing the HSDPA serving cell in SHO scenarios, thereby optimizing the UE throughput and system utilization.

In accordance with one aspect of the invention, an apparatus in a communication system includes a path searcher configured to determine, based on a signal from at least one cell in the communication system, an RSCP, an RSSI, and a path delay profile (PDP) including a plurality of path delays. The apparatus also includes an estimator configured to generate at least one of estimates of a load on the at least one cell and estimates of received signal level and interference level based on the PDP, including an estimate of the interference level for a weakest path delay, and of a channel impulse response corresponding to the at least one cell; and a control unit configured to generate at least one modified SNR value based on the RSCP, the RSSI, and at least one of the load estimates and the estimates of the received signal level, interference level, and channel impulse response.

In accordance with another aspect of the invention, a method of generating modified SNR values in a communication system includes the steps of determining, based on a signal from at least one cell in the communication system, an RSCP, an RSSI, and a PDP including a plurality of path delays for the at least one cell; estimating at least one of a load on the at least one cell and of a received signal level and interference level based on the PDP, including estimating an interference level for a weakest path delay, and a channel impulse response corresponding to the at least one cell; and generating at least one modified SNR value based on the RSCP, the RSSI, and at least one of the load estimate and the estimates of the received signal level, interference level, and channel impulse response.

BRIEF DESCRIPTION OF THE DRAWINGS

The various objects, features, and advantages of this invention will be understood by reading this description in conjunction with the drawings, in which.

DETAILED DESCRIPTION

In accordance with this invention, the usual measured $E_c/I_0$ values are replaced with modified $E_c/I_0$ determinations that are based on either or both of a path delay profile (PDP) and estimates of the load on the BS. As explained in more detail below, the PDP can be obtained from a path searcher in the receiver that is already needed for estimating the CPICH RSCP. Because PDP information is already available, it can easily be incorporated into the modified $E_c/I_0$ determinations.

It will be recognized that this invention is not limited to 3G communication systems. For example, U.S. patent application Ser. No. 11/289,184 filed on Nov. 29, 2005, by B. Lindoff et al. for "Efficient Cell Selection", which is incorporated here by reference, describes evolved-3G and 4G communication systems that employ orthogonal frequency division multiplexing.

Figure 3:
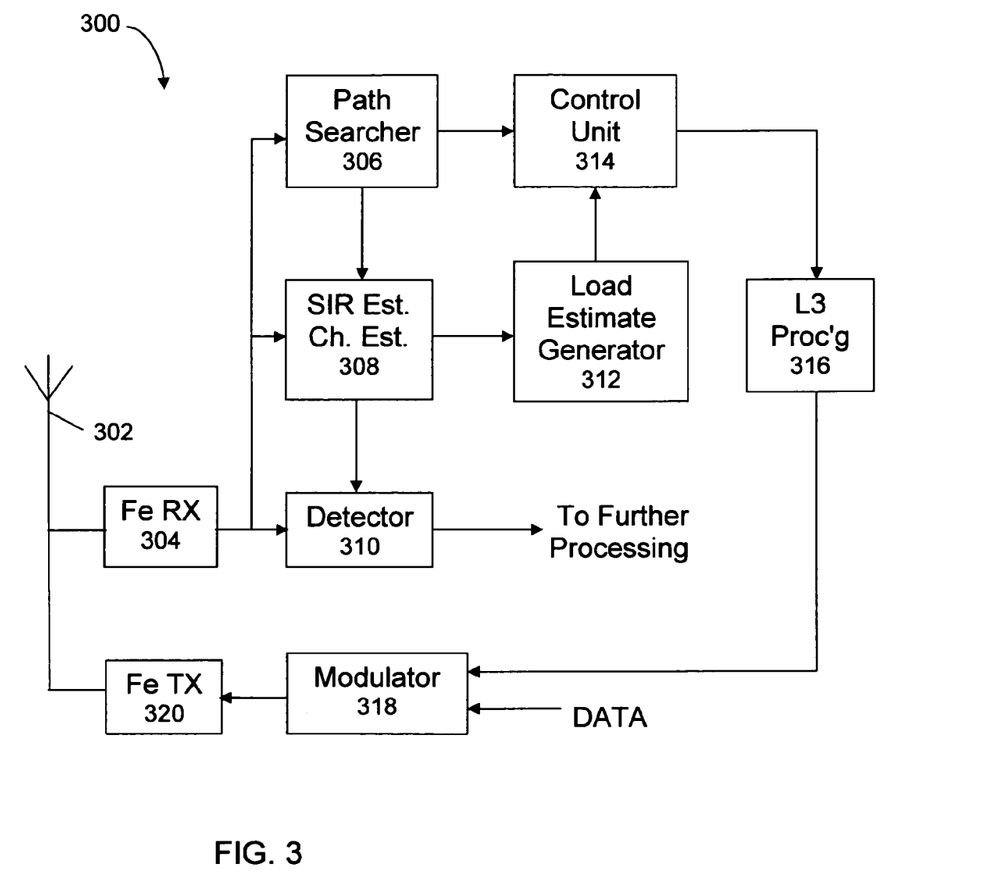
FIG. 3 is a block diagram of a portion of a UE.

FIG. 3 is a block diagram of a portion of a UE 300, such as a mobile terminal in a WCDMA communication system, that is in accordance with this invention. For simplicity, only some parts of the UE 300 are shown in the figure.

Signals transmitted by base stations are received through an antenna 302 and down-converted to base-band signals by a front-end receiver (Fe RX) 304. On a regular basis for all detected cells, the RSCP is estimated and the RSSI is computed by a path searcher 306. An RSCP can be estimated for example by de-spreading the base-band signal from a detected cell with the scrambling code (and CPICH channelization code) corresponding to the cell. The path searcher 306 also determines the numbers of paths L for all detected cells (i.e., the PDP) and computes the RSSIs.

Methods of computing RSSIs and of estimating PDPs are well known in the art. In suitable communication systems, for example, the RSSI can be estimated by computing the variance of the received signal over a given time period, such as one time slot (e.g., 0.67 milliseconds). The PDP can be estimated by, for example, correlating the received signal with the scrambling code (for the transmitting cell) and the CPICH channelization code for different time lags, where the longest time lag has a length corresponding to a worst-case assumption of the delay spread, e.g., 100 or so chips of the scrambling code. Then, signal peaks in the PDP can be determined as those peaks in the correlation result that have powers greater than a threshold, e.g., 5% of the highest signal peak's power. The rest of the correlation result can then be assumed to indicate no signal.

The PDP information is provided to a channel estimator and SIR estimator 308 that estimates the signal level S and interference level I for all fingers, or paths, from the searcher 306 and all detected cells. In some systems, this may not be done for all detected cells but only for those detected cells that are included in the Active Set. Channel estimation is well known in the art and is described in, for example, U.S. Patent Application Publication No. 2005/0105647 by Wilhelmsson et al. for "Channel Estimation by Adaptive Interpolation".

The estimates generated by the estimators 308 are provided to a detector 310, which uses the estimates in combining versions of the transmitted data and control symbols received along different paths and generating decoded symbols that are provided to further processing blocks in the receiver. Other blocks in FIG. 3 are described below, and it will be understood that the receiver can be implemented by other arrangements and combinations of the functional blocks shown in FIG. 3.

The interference level for the weakest path delay, which will typically be below the threshold mentioned above, may also be estimated by the estimator 308 as described below. This estimate is typically not used in the data combining by the detector 310, but may be provided to a load estimate generator 312 that determines an estimate of the load on each cell as described below. The load estimates are provided to a control unit 314, and can be generated in the following way.

In a communication system scenario such as that depicted in FIG. 2, the estimators 308 generate estimates of the CPICH power for a number of time lags, or path delays, from a BS, call it BS A. A common range of path delays is about two chips to about twenty chips, with a worst case of about 100 chips. The CPICH channel estimate $\hat{h}_i$ for the strongest path delay (which may be assumed to have index i) is given by:

$$\hat{h}_i = h_i \sqrt{E_C^{CPICH}} + n$$

where $h_i$ is the actual CPICH impulse response, $E_C^{CPICH}$ is the CPICH signal power, and n is noise. The CPICH signal power estimate $\hat{S}_i$ for that path is then given by:

$$\hat{S}_i = |\hat{h}_i|^2 \approx |h_i|^2 E_C^{CPICH} \quad (4)$$

in which the other parameters are as defined above.

It will be understood that the noise n can be assumed to be small with respect to the signal power for the strongest path. If the noise n is not small with respect to the signal power for the strongest path, then the CPICH signal power estimate $\hat{S}_i$ will simply include a bias, i.e., the signal power will be over-estimated. For cells in the Active Set, however, the CPICH power for the strongest cell is almost certainly quite strong and the bias can be neglected.

An estimate of the interference $\hat{I}_i$ due to another base station, call it BS B, for the strongest path delay is given by:

$$\hat{I}_i \approx \sum_{j \neq i} |h_j|^2 E_c^{j,Atot} + \sum_{j=1}^{L_B} |f_j|^2 E_c^{j,Btot} + \sigma^2 \quad (5)$$

where $f_j$ is the impulse response of the channel to BS B and the other parameters are as defined above.

An estimate of the signal power for the weakest path delay (which may be assumed to have index k) can be expected to be close to zero (i.e., the estimate includes mainly channel estimation noise), and the CPICH signal power for the weakest path is $S_k \approx 0$. An estimate of the interference for the weakest path delay $\hat{I}_k$ is given by:

$$\hat{I}_k \approx \sum_{j=1}^{L_A} |h_j|^2 E_c^{j,Atot} + \sum_{j=1}^{L_B} |f_j|^2 E_c^{j,Btot} + \sigma^2 \qquad (6)$$

$$= |h_i|^2 E_c^{i,Atot} + \sum_{j \neq i} |h_j|^2 E_c^{j,Atot} + \sum_{j=1}^{L_B} |f_j|^2 E_c^{j,Btot} + \sigma^2$$

$$= |h_i|^2 E_c^{i,Atot} + \hat{I}_i$$

where the other parameters are as defined above.

It will be understood that even in a "very rich" multi-path scenario, e.g., when 10-15 paths exist, the receiver correlates over perhaps 100 chips, and so there will in practice always be some no-signal paths. In a (theoretical) case having measurable signals on all path delays, the path delay having the weakest signal or a signal below a threshold would be designated as the weakest, which would result in a small bias (i.e., a less accurate load estimate). Thus, it will also be understood that the "weakest signal" need not be the absolutely weakest signal.

From Eqs. 4, 5, and 6, an estimate $\hat{R}_A$ of the CPICH power relative to the current load on the cell A is given by:

$$\hat{R}_A = \frac{\hat{S}_i}{\hat{I}_k - \hat{I}_i} \qquad (7)$$

$$\approx \frac{E_c^{CPICH}}{E_c^{Atot}}$$

where the other parameters are as defined above. The load estimates generated by the generator 312 are given by Eq. 7. It will be observed from Eq. 7 that the larger the ratio, the more of the total power transmitted from the BS is devoted to the BS's CPICH. Because the CPICH in a WCDMA system is transmitted with a fixed fraction, typically around 10%, or 0.1, of the maximum BS transmit power, an estimate of the BS's currently available excess transmit power $E_c^e$ is given by:

$$E_c^e \approx (1/g) \cdot \hat{S}_i - (\hat{I}_k - \hat{I}_i) \qquad (8)$$

where g is the CPICH's fraction of the maximum power. Of course, the excess power is simply inversely proportional to the load on the BS, and thus the excess power in itself is an estimate of the load on the BS.

The control unit 314 advantageously generates modified $E_C/I_0$ values based on the $E_C/I_0$ measurements (see Eq. 1) and on either or both of PDP information and load estimates for some or all of the detected cells as described above. In particular, the modified $E_C/I_0$ values for a base station A ($E_C/I_0)_{mod,A}$ are given by and can be seen to correspond to the true HSDPA SIR for the base station A from the following relationship:

$$\left(\frac{E_c}{I_o}\right)_{mod,A} \approx \sum_{l=1}^{L_A} \frac{\hat{S}_i \left(\frac{1}{g} - \frac{1}{\hat{R}_A}\right)}{RSSI - \frac{\hat{S}_i}{\hat{R}_A}} \qquad (9)$$

$$\approx \sum_{l=1}^{L_A} \frac{E_c^e}{RSSI - \frac{\hat{S}_i}{\hat{R}_A}}$$

in which the other parameters are as defined above.

Eq. 9 can be seen as a guide for generating modified $E_C/I_0$ values based on both PDP information and load estimate information. It will be noted that the numerator in the summation is the load estimate as given by Eq. 8. By substituting Eq. 7 into the right-hand side of Eq. 9 and simplifying, the result is a guide for generating modified $E_C/I_0$ values either based on the CPICH signal power estimate $\hat{S}_i$ and the estimates of the interference for the strongest and weakest path delays $\hat{I}_i$, $\hat{I}_k$ or based on the load estimates given by Eq. 8, and these modified $E_C/I_0$ values are given by:

$$\left(\frac{E_c}{I_o}\right)_{mod,A} \approx \sum_{l=1}^{L_A} \frac{(1/g) \cdot \hat{S}_i - \hat{I}_k + \hat{I}_i}{RSSI - \hat{I}_k + \hat{I}_i} \qquad (10)$$

In addition, the following relationship will be seen as a guide for generating modified $E_C/I_0$ values that take interference into account:

$$\left(\frac{E_c}{I_o}\right)_{mod,A} \approx \sum_{l=1}^{L_A} \frac{\hat{S}_i}{RSSI - \frac{\hat{S}_i}{\hat{R}_A}} \qquad (11)$$

Furthermore, the following relationship will be seen as a guide for generating modified $E_C/I_0$ values that take base station load into account:

$$\left(\frac{E_c}{I_o}\right)_{mod,A} \approx \frac{\hat{S}_i \left(\frac{1}{g} - \frac{1}{\hat{R}_A}\right)}{RSSI} \qquad (12)$$

$$\approx \frac{E_c^e}{RSSI}$$

In a WCDMA system and in many other communication systems, the transmitted CPICH power $E_c^{CPICH}$ can be obtained from a broadcast message from the BS. The base station's maximum power may be unknown to the terminal (it may also be signaled in a broadcast message, of course), but based on knowledge that the CPICH is transmitted with a particular fraction g, such as 10%, of the maximum BS power as in the example above, an estimate of the maximum BS power can be made that is suitable for determining the optimal HS serving cell. It will be understood that fractions other than 10% may be used.

As shown in FIG. 3, the control unit 314 provides modified $E_C/I_0$ values ($E_C/I_0)_{mod}$ to a Layer 3 (L3) processing component 316 that advantageously may filter the modified $E_C/I_0$ values, with filter parameters (e.g., time constant, etc.) that depend on network parameters. For example, the filtering can be an exponential filter, such that $(E_C/I_0)_{L3}(t)=a(E_C/I_0)_{L3}(t-1)+(1-a)(E_C/I_0)_{mod}(t)$, where $(E_C/I_0)_{L3}(t)$ is a filtered modified $E_C/I_0$ value at time instant t, and a is a network-dependent filter parameter, e.g., 0.5, 0.25, or 0.125. In any event, the L3 component 316 determines the largest of the (possibly filtered) modified $E_C/I_0$ values, for example with a comparator, and according to the largest value, the L3 component 316 may trigger a change of HS serving cell.

In order to ensure that the modified $E_C/I_0$ values for a base station do not differ excessively from the measured $E_C/I_0$ values for the base station, the control unit 314 may compare the measured and modified values on an occasional or regular basis. If a modified value differs excessively from a measured value, the control unit 314 can simply reduce the modified value such that it is suitably closer to the measured value. It is currently believed that a difference of about 1.5 dB would be "excessive", although other values may also be suitable.

Rather than generating modified $E_C/I_0$ values in a UE, it will be understood that the UE may simply report its $E_C/I_0$ measurements to another entity, such as a base station or radio network controller depicted in FIG. 1, in the communication system. A suitable processor in that entity can then determine the modified $E_C/I_0$ values, etc. based on the system's knowledge of the BS loads, as indicated by Eq. 7 for example, and/or its own estimates of the interference level. On the other hand, it currently appears more advantageous to carry out these steps in the UE as doing so can avoid changes in the system specifications to provide for reporting the $E_C/I_0$ measurements.

As described above, in a communication system such as a WCDMA system according to the 3GPP specification, the UE measures the average SIR (e.g., $E_C/I_0$) of the CPICHs it receives from all cells in its Active Set on a regular basis, and the cell having the best SIR on these non-HSDPA channels is designated as the HSDPA serving cell. The UE's determination of an average SIR of the DL from a different cell in the Active Set that is larger than the SIR measured for the serving cell triggers an event 1D (change of best cell) and transmission of a Layer-3 radio resource control (RRC) message on the UL DPDCH.

A suitable signal indicating such a change event, such as an L3 RRC event-1D message, is provided to a modulator 318, which also receives other data to be transmitted by the UE 300. The change signal may be transmitted to the base station either on occurrence of the event or on a regular basis. The change signal and data are appropriately transformed into a modulation signal, which is provided to a front-end transmitter (Fe TX) 320 that up-converts or otherwise transforms the modulation signal for transmission to the base station(s).

The network (e.g., the BSs and RNC) then can use the change signal in selecting the HS serving cell. In a 3GPP-compliant system, the RNC receives the event-1D message and transmits a "change of HS serving cell message" to the UE as an L3 RRC message on the DL DPDCH. The "change" message includes information about a time instant at which the HS channels will (hard) hand over to the new BS. When the UE has made the HO to the new cell, it transmits an ACK message on the UL DPDCH to the new and old BSs and the RNC.

Figure 4:
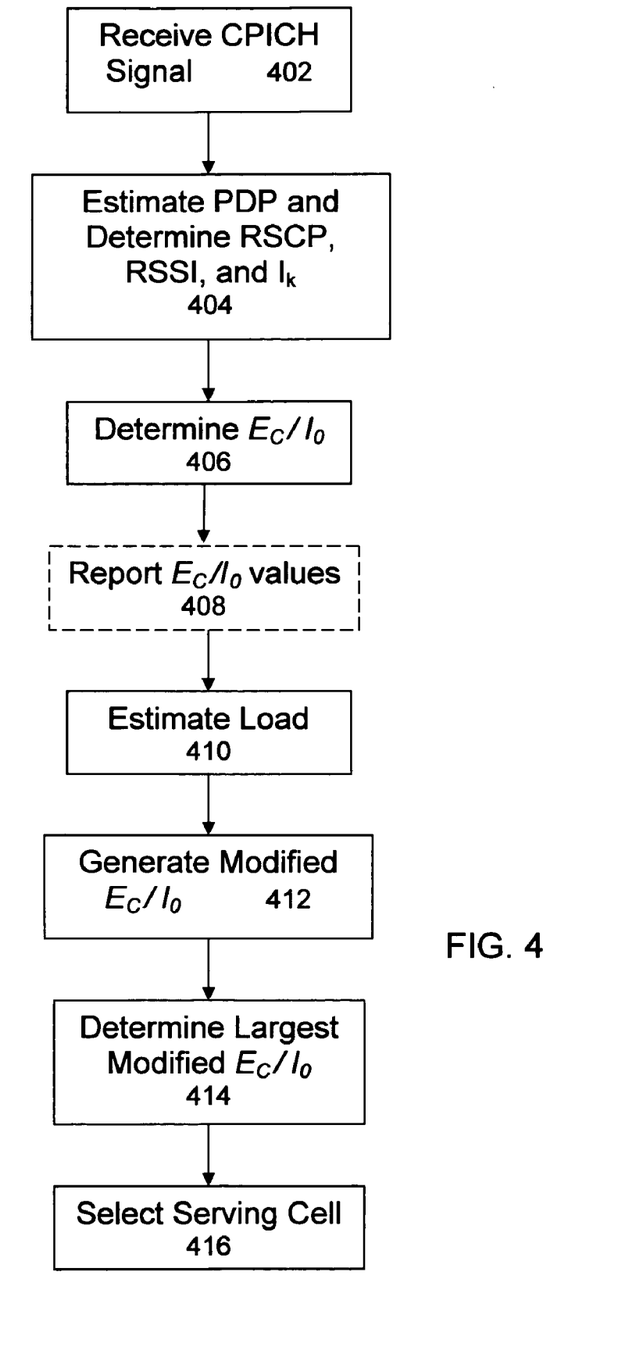
FIG. 4 is a flow chart of a method in accordance with the principles of this invention.

Referring now to FIG. 4, a UE in a communication system can carry out an advantageous method of generating modified $E_C/I_0$ values as described above. The method includes receiving a signal, such as a CPICH signal (step 402), and based on the signal, estimating the PDP and determining the RSCP and RSSI (step 404). The method further includes determining $E_C/I_0$ based on the RSCP and RSSI parameters (step 406), and in particular, $E_C/I_0$=RSCP/RSSI. These parameters may be computed for CPICH signals received from one or more cells, e.g., all cells in the Active Set. As described above, the measured $E_C/I_0$ values may be reported to a base station or other entity in the communication system (step 408), but this is not required as indicated by the dashed lines. The method may further include estimating the load for a BS corresponding to the received signal (step 410).

Modified $E_C/I_0$ values are generated based on the PDP (in particular, the interference level for the weakest path) and/or the load estimates (step 412) according to the above-described Eqs. 9-12. Indeed, all of these parameters used in the method can be determined from the equations listed above, and it will be understood that the method steps can be readily adjusted and ordered so that a modified $E_C/I_0$ value is generated based on either or both of the PDP and the load estimate.

In addition, the steps of the method of generating modified $E_C/I_0$ values can be included in a method of selecting a serving cell in the communication system. Such a method further includes determining a largest modified $E_C/I_0$ value in a group of modified $E_C/I_0$ values, e.g., the cells in the Active Set (step 414). This determination may include filtering the modified $E_C/I_0$ values as described above. Based on the largest value, a selection or re-selection of HS serving cell is triggered (step 416), for example by sending a change signal such as an event-1D L3 RRC message on an UL channel. In response to the change signal, the network transmits a "change of HS serving cell message" to the UE as an L3 RRC message as described above.

Of course, it will be understood that these steps can be carried out more than once in series or in parallel in order to generate modified $E_C/I_0$ values for a number of cells. In addition as noted above, the UE may simply report its $E_C/I_0$ measurements to the network, which then determines the modified $E_C/I_0$ values, etc. based on the network's knowledge of the BS loads. On the other hand, it currently appears more advantageous to carry out these steps in the UE as doing so can avoid changes in the system specifications.

In view of this description, it is advantageous for HSDPA cell selection to be based on the modified $E_C/I_0$ values described above rather than the conventional $E_C/I_0$ values.

The 3GPP specifications appear not to define a test for the event 1D, which may explain their overall requirement that one should measure $E_C/I_0$ as defined as RSCP/RSSI. In view of that overall requirement, the 3GPP specifications impose requirements on the tolerable error in these measurements (i.e., from ±1.5 dB to ±3 dB) in Table 9.5, CPICH_Ec/Io Intra frequency absolute accuracy, of TS 25.133. For the best serving cell, $E_C/I_0$ is expected to be at least about −15 dB or better, and hence the specifications allow such errors.

It will be understood that if a UE's measurement error is better than those required by the system specification (e.g., ±0.5 dB for $E_C/I_0$>−15 dB), then extra freedom is available (e.g., about 1 dB) that can be used for adjusting the $E_C/I_0$.

One way to use such extra freedom is to note that a one-tap, or line-of-sight (LoS), communication channel between the BS and the UE is always better than a multi-tap channel, in which the sum over all taps of the CPICH power is equal to the LoS-channel CPICH power, because the orthogonality of the WCDMA channelization codes makes intra-cell interference orthogonal to signal power in the LoS case. A typical gain for a single path over multi-path is in the range of 0.5-1 dB, meaning if $E_C/I_0$=−13 dB in a multi-path cell, a single-path cell having $E_C/I_0$>−14 dB could be favored for selection as the HSDPA serving cell over that multi-path cell. It will be noted that use of the extra freedom in this way is permitted as long as the measurement error requirement (e.g., from ±1.5 dB to ±3 dB) is fulfilled.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Newer communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. An apparatus in a communication system, comprising:
a path searcher configured to determine, based on a signal from at least one cell in the communication system, a received signal code power (RSCP), a received signal strength indication (RSSI), and a path delay profile (PDP) including a plurality of path delays;
an estimator configured to generate an estimate of a load on the at least one cell; and
a control unit configured to generate at least one modified signal-to-noise-ratio (SNR) value based on the RSCP, the RSSI, and the load estimate;
wherein the estimator is configured to generate the estimate of the load based on estimates of a received signal level $\hat{S}_i$ and an interference level based on the PDP, including an estimate of an interference level $\hat{I}_k$ for a weakest path delay and an estimate of an interference level $\hat{I}_i$ for a strongest path delay.

2. The apparatus of claim 1, wherein the load estimate corresponds to a ratio a power of a common pilot channel to a total power of the cell.

3. The apparatus of claim 1, wherein the load estimate corresponds to a currently available excess transmit power $E_c^e$ in the at least one cell that is given by:

$$E_c^e \approx (1/g) \cdot \hat{S}_i - (\hat{I}_k - \hat{I}_i)$$

in which g represents a fraction of a maximum power transmitted by the at least one cell, $\hat{S}_i$ represents the estimate of the received signal level, $\hat{I}_k$ represents the estimate of the interference level for the weakest path delay, and $\hat{I}_i$ represents an estimate of the interference level for a strongest path delay.

4. The apparatus of claim 3, wherein g is 0.1.

5. The apparatus of claim 1, wherein the modified SNR value is given by:

$$\left(\frac{E_c}{I_o}\right)_{mod,A} \approx \sum_{i=1}^{L_A} \frac{\hat{S}_i\left(\frac{1}{g} - \frac{1}{\hat{R}_A}\right)}{RSSI - \frac{\hat{S}_i}{\hat{R}_A}} \approx \sum_{i=1}^{L_A} \frac{E_c^e}{RSSI - \frac{\hat{S}_i}{\hat{R}_A}}$$

in which $$\left(\frac{E_c}{I_o}\right)_{mod,A}$$

represents the modified SNR value, $L_A$ represents a number of signal paths to the at least one cell, $\hat{S}_i$ represents the estimate of the received signal level, g represents a fraction of a maximum power transmitted by the at least one cell, $\hat{R}_A$ represents the load estimate, and $\hat{E}_c^e$ represents a currently available excess transmit power of the at least one cell.

6. The apparatus of claim 1, wherein the modified SNR value is given by:

$$\left(\frac{E_c}{I_o}\right)_{mod,A} \approx \sum_{i=1}^{L_A} \frac{\hat{S}_i}{RSSI - \frac{\hat{S}_i}{\hat{R}_A}}$$

in which $$\left(\frac{E_c}{I_o}\right)_{mod,A}$$

represents the modified SNR value, $L_A$ represents a number of signal paths to the at least one cell, $\hat{S}_i$ represents the estimate of the received signal level, and $\hat{R}_A$ represents the load estimate.

7. The apparatus of claim 1, wherein the modified SNR value is given by:

$$\left(\frac{E_c}{I_o}\right)_{mod,A} \approx \frac{S_i\left(\frac{1}{g} - \frac{1}{\hat{R}_A}\right)}{RSSI} \approx \frac{E_c^e}{RSSI}$$

in which $$\left(\frac{E_c}{I_o}\right)_{mod,A}$$

represents the modified SNR value, $\hat{S}_i$ represents the estimate of the received signal level, g represents a fraction of a maximum power transmitted by the at least one cell, $\hat{R}_A$ represents the load estimate, and $\hat{E}_c^e$ represents a currently available excess transmit power of the at least one cell.

8. The apparatus of claim 1, wherein the estimator generates estimates that correspond to cells in an active set.

9. The apparatus of claim 1, further comprising a filter configured to smooth modified SNR values and to determine a largest smoothed modified SNR value.

10. The apparatus of claim 9, further comprising a signal generator configured to generate, based on the largest smoothed modified SNR value, a change event signal.

11. The apparatus of claim 10, wherein the change event signal is a Layer 3 Radio Resource Control message.

12. The apparatus of claim 1, wherein the apparatus is included in a user equipment in the communication system, and the load estimate is determined from the respective estimate of the interference level for the weakest path delay and the respective estimate of the channel impulse response.

13. The apparatus of claim 12, wherein the user equipment is a mobile terminal in a wideband code division multiple access communication system.

14. The apparatus of claim 1, wherein the path searcher is included in a user equipment in the communication system, and the estimator and control unit are included in at least one other entity in the communication system.

15. The apparatus of claim 1, wherein the RSCP is estimated by de-spreading a base-band signal with a scrambling code and a channelization code corresponding to the at least one cell.

16. The apparatus of claim 1, wherein the estimator is further configured to generate the interference estimates $\hat{I}_k$, $\hat{I}_i$ based on a channel impulse response.

17. A method of generating modified signal-to-noise-ratio (SNR) values in a user equipment in a communication system, comprising the steps of:
  determining, based on a signal from at least one cell in the communication system, a received signal code power (RSCP), a received signal strength indication (RSSI), and a path delay profile (PDP) including a plurality of path delays for the at least one cell;
  estimating a load on the at least one cell; and
  generating at least one modified SNR value based on the RSCP, the RSSI, and the load estimates;
  wherein estimating the load on the at least one cell comprises generating the load estimate based on estimates of a received signal level $\hat{S}_i$ and interference level based on the PDP, including an estimate of an interference level $\hat{I}_k$ for a weakest path delay and an estimate of an interference level $\hat{I}_k$ for a strongest path delay.

18. The method of claim 17, wherein the load estimate corresponds to a ratio of a power of a common pilot channel to a total power of the cell.

19. The method of claim 17, wherein the load estimate corresponds to a currently available excess transmit power $E_c^e$ in the at least one cell that is given by:

$$E_c^e \approx (1/g) \cdot \hat{S}_i - (\hat{I}_k - \hat{I}_i)$$

in which g represents a fraction of a maximum power transmitted by the at least one cell, $\hat{S}_i$ represents the estimate of the received signal level, $\hat{I}_k$ represents the estimate of the interference level for the weakest path delay, and $\hat{I}_i$ represents an estimate of the interference level for a strongest path delay.

20. The method of claim 19, wherein g is 0.1.

21. The method of claim 17, wherein the modified SNR value is given by:

$$\left(\frac{E_c}{I_o}\right)_{mod,A} \approx \sum_{l=1}^{L_A} \frac{\hat{S}_i\left(\frac{1}{g} - \frac{1}{\hat{R}_A}\right)}{RSSI - \frac{\hat{S}_i}{\hat{R}_A}}$$

$$\approx \sum_{l=1}^{L_A} \frac{E_c^e}{RSSI - \frac{\hat{S}_i}{\hat{R}_A}}$$

in which $$\left(\frac{E_c}{I_o}\right)_{mod,A}$$

represents the modified SNR value, $L_A$ represents a number of signal paths to the at least one cell, $\hat{S}_i$ represents the estimate of the received signal level, g represents a fraction of a maximum power transmitted by the at least one cell, $\hat{R}_A$ represents the load estimate, and $E_c^e$ represents a currently available excess transmit power of the at least one cell.

22. The method of claim 17, wherein the modified SNR value is given by:

$$\left(\frac{E_c}{I_o}\right)_{mod,A} \approx \sum_{l=1}^{L_A} \frac{\hat{S}_i}{RSSI - \frac{\hat{S}_i}{\hat{R}_A}}$$

in which $$\left(\frac{E_c}{I_o}\right)_{mod,A}$$

represents the modified SNR value, $L_A$ represents a number of signal paths to the at least one cell, $\hat{S}_i$ represents the estimate of the received signal level, and $\hat{R}_A$ represents the load estimate.

23. The method of claim 17, wherein the modified SNR value is given by:

$$\left(\frac{E_c}{I_o}\right)_{mod,A} \approx \frac{\hat{S}_i\left(\frac{1}{g} - \frac{1}{\hat{R}_A}\right)}{RSSI} \approx \frac{E_c^e}{RSSI}$$

in which $$\left(\frac{E_c}{I_o}\right)_{mod,A}$$

represents the modified SNR value, $\hat{S}_i$ represents the estimate of the received signal level, g represents a fraction of a maximum power transmitted by the at least one cell, $\hat{R}_A$ represents the load estimate, and $E_c^e$ represents a currently available excess transmit power of the at least one cell.

24. The method of claim 17, wherein the estimating step is carried out for cells in an active set.

25. The method of claim 17, further comprising the steps of smoothing modified SNR values and determining a largest smoothed modified SNR value.

26. The method of claim 25, further comprising the step of generating, based on the largest smoothed modified SNR value, a change event signal.

27. The method of claim 26, wherein the change event signal is a Layer 3 Radio Resource Control message.

28. The method of claim 17, wherein the method is carried out in a user equipment in the communication system, and the load estimate is determined from the respective estimate of the interference level for the weakest path delay and the respective estimate of the channel impulse response.

29. The method of claim 17, wherein the determining step is carried out in a user equipment in the communication system, and the estimating and generating steps are carried out in at least one other entity in the communication system.

30. The method of claim 17, wherein the RSCP is estimated by de-spreading a base-band signal with a scrambling code and a channelization code corresponding to the at least one cell.

31. The method of claim 17, wherein estimating the load on the at least one cell further comprises generating the interference estimates $\hat{I}_k$, $\hat{I}_i$ based on a channel impulse response.

* * * * *